(12) United States Patent
Jermstad et al.

(10) Patent No.: US 11,089,675 B2
(45) Date of Patent: Aug. 10, 2021

(54) TAMPER SENSOR

(71) Applicant: TE CONNECTIVITY CORPORATION, Berwyn, PA (US)

(72) Inventors: Kenneth Jermstad, Hampton, VA (US); Michael Ritchie, Hampton, VA (US); Marcus Updyke, Portsmouth, VA (US); Anthony Ball, Virginia Beach, VA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 326 days.

(21) Appl. No.: 16/166,560

(22) Filed: Oct. 22, 2018

(65) Prior Publication Data

US 2020/0128663 A1 Apr. 23, 2020

(51) Int. Cl.
*G06F 21/00* (2013.01)
*H05K 1/02* (2006.01)
*G06F 21/87* (2013.01)
*G08B 13/12* (2006.01)

(52) U.S. Cl.
CPC ........... *H05K 1/0275* (2013.01); *G06F 21/87* (2013.01); *G08B 13/128* (2013.01); *H05K 2201/10151* (2013.01)

(58) Field of Classification Search
CPC ....... G06F 21/87; G06F 21/86; G08B 13/128; H05K 1/0275; H05K 2201/10151
See application file for complete search history.

(56) References Cited

U.S. PATENT DOCUMENTS

| | | | |
|---|---|---|---|
| 5,285,734 A | 2/1994 | MacPherson | |
| 5,858,500 A | 1/1999 | MacPherson | |
| 6,686,539 B2 | 2/2004 | Farquhar et al. | |
| 7,323,986 B2 | 1/2008 | Hunter et al. | |
| 7,549,064 B2 | 6/2009 | Elbert et al. | |
| 7,760,086 B2 | 7/2010 | Hunter et al. | |
| 7,787,256 B2* | 8/2010 | Chan | G08B 13/128 361/760 |
| 7,978,070 B2 | 7/2011 | Hunter | |
| 9,554,477 B1 | 1/2017 | Brodsky et al. | |
| 9,560,737 B2 | 1/2017 | Isaacs et al. | |
| 9,661,747 B1 | 5/2017 | Brodsky et al. | |
| 9,717,154 B2 | 7/2017 | Brodsky et al. | |
| 2004/0020047 A1* | 2/2004 | Nishikawa | H05K 3/0017 29/852 |
| 2006/0259788 A1* | 11/2006 | Elbert | H05K 1/0275 713/194 |
| 2008/0278353 A1 | 11/2008 | Smith et al. | |

(Continued)

FOREIGN PATENT DOCUMENTS

| | | |
|---|---|---|
| WO | 1999021142 A | 4/1999 |
| WO | 2005098950 A1 | 10/2005 |
| WO | 2009023075 A1 | 2/2009 |

OTHER PUBLICATIONS

Extended European Search Report, European Application No. 19204433.7-1218, European Filing Date, Jan. 23, 2020.

*Primary Examiner* — Tri M Tran

(57) ABSTRACT

A tamper sensor that includes a substrate and a conductive layer placed on the substrate. The tamper sensor also includes an insulation layer that is stacked on the conductive layer to form a layered tamper circuit. In addition, the substrate of the tamper sensor is the only substrate of the tamper sensor.

19 Claims, 2 Drawing Sheets

(56) References Cited

U.S. PATENT DOCUMENTS

2014/0028335 A1\* 1/2014 Salle .................. H05K 1/0275
                                                  324/705
2017/0091491 A1   3/2017 Dangler et al.
2018/0148241 A1   5/2018 Gulas \* cited by examiner

TAMPER SENSOR

BACKGROUND OF THE INVENTION

The subject matter herein relates generally to tamper sensors.

Tamper sensors and tamper sensor assemblies are provided to prevent direct physical access and/or intentional damage to sensitive hardware of a computing device. Specifically, while software is vulnerable to hackers, malware attacks, viruses, and the like, hardware components similarly can be attacked by individuals attempting to steal or destroy valuable information of an individual or company.

As a result of hardware based attacks, tamper sensors have been developed. Tamper sensors are coupled to hardware components and detect if an individual is attempting to physically access the hardware. The desired operation of such a tamper sensor is to detect when an individual is physically accessing, or tampering with the hardware.

However, individuals attempting to steal or destroy valuable information continually attempt to circumvent these sensors. Such individuals attempt to find any opening within the sensor to access the hardware. Specifically, any hardware component or portion of a hardware component not within a protective zone of a sensor assembly is vulnerable to attack that can result in the tamper sensor to be bypassed. Alternatively, solvents are used to dissolve or destroy adhesives within a sensor assembly that can be harmful to the sensor and hardware. Similarly attempts at physical penetration through drilling, puncturing with a punch or laser, mechanical disassembly or the like are utilized to gain access to protected data. As a result, the Federal Information Processing Standard (FIPS) has been developed to rate the security of a computing device. Specifically, FIPS Publication 140-2 that is incorporated in full herein, specifically has provided ratings related to hardware and software security by providing four (4) levels of security within the standard.

Accordingly, there is a need for a tamper assembly that minimizes access to the hardware being protected. Also desired is a tamper assembly that is resistant to solvent based attacks and other attacks such that a level four (4) FIPS Publication rating will be provided for hardware utilizing the tamper assembly.

BRIEF DESCRIPTION OF THE INVENTION

In an embodiment, a tamper sensor assembly is provided that includes a substrate. The substrate includes a protective bulk section with tamper circuitry, a hardware section configured to receive hardware circuitry and extending from the protective bulk section; the hardware circuitry electrically connected to the tamper circuitry to alter operation of the hardware circuitry responsive to modification of the tamper circuitry, and an attachment section extending from the hardware section. The tamper sensor assembly also includes a first fold in the substrate to position a first portion of the hardware section to extend along the protective bulk section, and a second fold in the substrate to position a second portion of the hardware section to extend along the first portion of the hardware section.

In another embodiment, a method of manufacturing a tamper sensor assembly is provided that includes layering tamper circuitry on a substrate in a protective bulkhead section of the substrate. The method also provides placing hardware circuitry on the substrate in a hardware section of the substrate, and connecting the hardware circuitry to the tamper circuitry such that the tamper circuitry alters operation of the hardware circuitry when the tamper circuitry is modified. The substrate is folded a first time to extend a first portion of the hardware section along the protective bulkhead section of the substrate, and folded a second time to extend a second portion of the hardware section along the first portion of the hardware section of the substrate.

In another embodiment, a tamper sensor assembly is provided that includes a substrate with a protective bulk section having tamper circuitry and a hardware section having hardware circuitry extending from the protective bulk section, wherein the hardware circuitry is altered responsive to modification of the tamper circuitry. The tamper sensor assembly also includes a protective bulk section fold along an edge of the protective bulk section adjacent the hardware section to engage a first portion of the hardware section against the protective bulk section along a first engagement surface of the hardware section. The tamper sensor assembly additionally includes a hardware section fold in the hardware section to engage a second portion of the hardware section against the first portion of the hardware section along a second engagement surface of the hardware section opposite the first engagement surface of the hardware section to enclose the first portion of the hardware section.

DETAILED DESCRIPTION OF THE INVENTION

Embodiments set forth herein may include various tamper sensors. The tamper sensors may fit into computing devices, including but not limited to personal computers, laptop computers, smart devices, and the like. Similarly, hardware that is received within each tamper sensor assembly may include, central processing units, data storage or memories, cards, including graphic cards, sound cards, and memory cards, or the like.

In various embodiments, the tamper sensor has a single substrate that includes stacked conductive layers and insulation layers without the need for adhesives. Instead, the layers are secured together and an electrical connection is provided with a via disposed between conductive layers through a window within an insulation layer.

Figure 1:
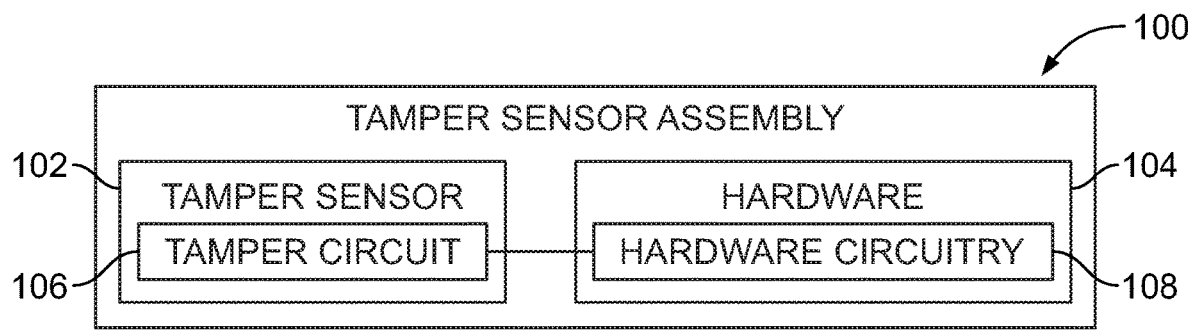
FIG. 1 is a schematic block diagram of a tamper sensor assembly in an unfolded condition in accordance with an exemplary embodiment.

FIG. 1 is a schematic block diagram of a tamper sensor assembly 100 formed in accordance with an embodiment. The tamper sensor assembly 100 includes a tamper sensor 102 that encloses and protects the hardware 104 of a computing device. The tamper sensor 102 includes tamper circuitry 106 that is electrically connected to hardware circuitry 108 of the hardware 104 such that when the tamper circuitry 106 is modified, or altered, the hardware circuitry 108 in response to the modification or alteration is modified or altered. In one example, when the tamper circuitry 106 shorts, the hardware circuitry 108 in response erases files information containing secrets and information about a user to prevent access to software related to these secrets and information and to prevent software damage.

Figure 2:
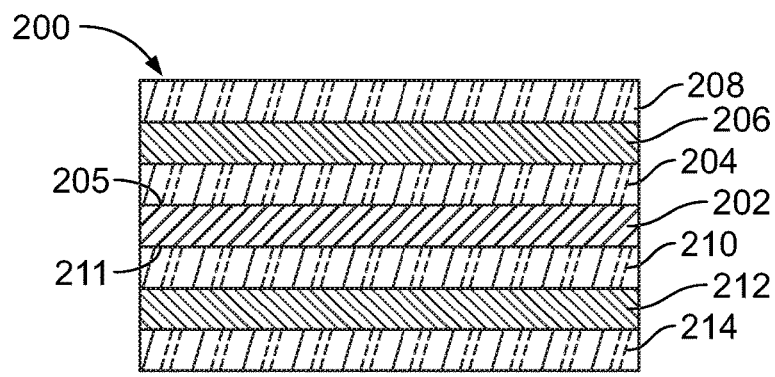
FIG. 2 is a schematic view of a tamper sensor in accordance with an exemplary embodiment.

FIG. 2 is a schematic view of a tamper sensor 200 in accordance with an exemplary embodiment. The tamper sensor 200 includes a substrate 202, a first top-side conductive layer 204, a first top-side insulation layer 206, a second top-side conductive layer 208, a first bottom-side conductive layer 210, a first bottom-side insulation layer 212, and a second bottom-side conductive layer 214.

The substrate 202 in one example is a polyvinylidene fluoride or polyvinylidene difluoride (PVDF) film. The first top-side conductive layer 204, in one example is printed onto the top surface 205 of the substrate 202. The first top-side insulation layer 206 engages and extends from the first top-side conductive layer 208. In one example the first top-side insulation layer 206 is printed on the first top-side conductive layer 208. The second top-side conductive layer 208 engages and extends from the first top-side insulation layer 206. In one example, the second top-side conductive layer 208 is printed on top of the first top-side insulation layer 206 and electrically connected to the first top-side conductive layer 208 to form a mesh circuit. In another example, the first top-side conductive layer 204 and second top-side conductive layer 208 are serpentine traces that form a mesh circuit. In yet another example, the first top-side conductive layer 204 and second top-side conductive layer 208 are flood planes.

In example embodiments the first top-side conductive layer 204, first top-side insulation layer 206, and second top-side conductive layer 208 can be printed onto the substrate and an algorithm may be used to determine positioning of windows in the first top-side insulation layer 206 in order to provide via through the window to electrically connect the first top-side conductive layer 204 and second top-side conductive layer 208. In this manner blind via are placed within the mesh circuit to provide additional security and randomness to the senor 200. Similarly a buried via is provided. This results in more difficulties in tampering with the circuitry. Alternatively, the first top-side conductive layer 204 and second top-side conductive layer 208 are electrically connected by crimping.

The first bottom-side conductive layer 210, in one example is printed onto a bottom surface 211 of the substrate 202. In another example, the first bottom-side conductive layer 210 is a serpentine trace. The first bottom-side insulation layer 212 engages and extends from the first bottom-side conductive layer 210. In one example the first bottom-side insulation layer 212 is printed on the first bottom-side conductive layer 210. The second bottom-side conductive layer 214 engages and extends from the first bottom-side insulation layer 212. In one example, the second bottom-side conductive layer 214 is printed below the first bottom-side insulation layer 212 and electrically connected to the first bottom-side conductive layer 210 to form a mesh circuit.

In one example, the second bottom-side conductive layer 214 is printed on top of the first bottom-side insulation layer 212 and electrically connected to the first bottom-side conductive layer 210 to form a mesh circuit. In one example, the first bottom-side conductive layer 210 and second bottom-side conductive layer 214 are serpentine traces that form a mesh circuit. In yet another example, the first bottom-side conductive layer 210 and second bottom-side conductive layer 214 are mesh flood planes. Specifically, in example embodiments the first bottom-side conductive layer 210, first bottom-side insulation layer 212, and second bottom-side conductive layer 214 can be printed onto the substrate and a layering algorithm may be used to determine positioning of windows in the first bottom-side insulation layer 212 in order to provide vias through the window to electrically connect the first bottom-side conductive layer 210 and second bottom-side conductive layer 214. In this manner blind via are placed within the mesh circuit to provide additional security and randomness to the senor 200. Similarly a buried via is provided. This results in more difficulties in tampering the circuitry. Alternatively, the first bottom-side conductive layer 210 and second bottom-side conductive layer 214 are electrically connected by crimping.

In the exemplary embodiment of FIG. 2, the material of the conductive layers 204, 208, 210, 214 are selected in combination with material of the insulation layers 206, 212 to have chemical properties that provide adhesive forces between printed layers such that adhesives are eliminated. To that end, in one example, the conductive layers 204, 208, 210, 214 are formed from a silver based material while the insulation layers 206, 212 are formed from a dielectric material with enhanced cross-linking. By selecting such materials, when printing the layers on the substrate 202 adhesives may be eliminated from the sensor preventing adhesive solvent based attacks on the tamper sensor 200. Alternatively, an adhesive is included in the tamper sensor 200 if desired, either as an adhesive layer, or as an additive to at least one insulation layer 206 or 212.

In addition, the selected materials allow for a reduction in passes to for the individual layers. In one example, only two passes are required to form each insulation layer 206, 212. Additionally, if an agent or solvent is utilized to dissolve or harm the top-side insulation layer 206 in a similar attack, as a result of the alternating arrangement between conductive layers 204, 208, 210, 214 and insulation layers 206, 212, the conductive layers 204, 208, 210, or 214 on either side of the attacked insulation layer 206 or 212 shorts, resulting in modification of hardware circuitry, protecting the hardware of the computing device.

Figure 3:
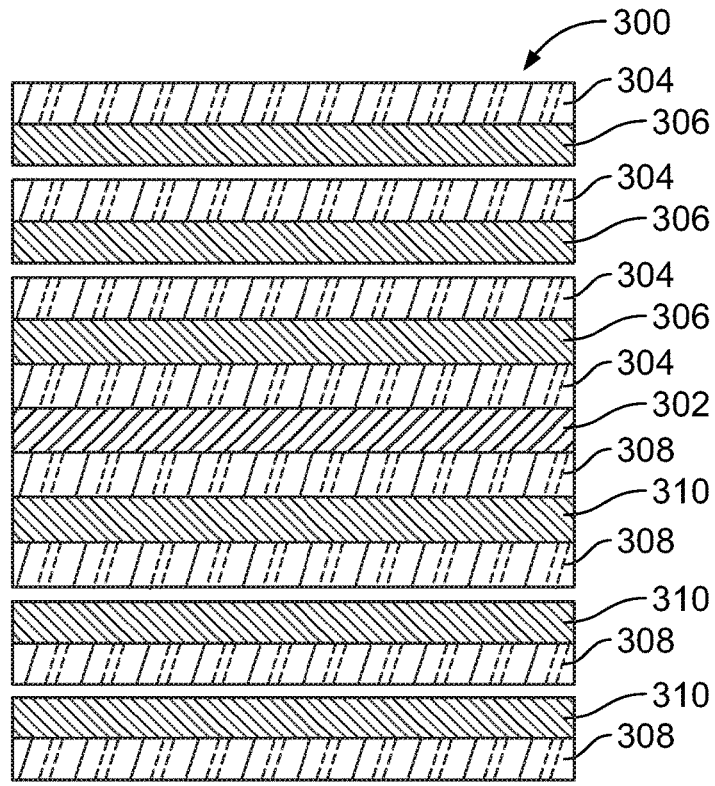
FIG. 3 is a schematic view of a tamper sensor in accordance with an exemplary embodiment.

FIG. 3 illustrates a schematic diagram of a sensor 300 in accordance with an exemplary embodiment. The tamper sensor 300 includes a substrate 302, a plurality of top-side conductive layers 304, a plurality of top-side insulation layers 306, a plurality of bottom-side conductive layers 308, and a plurality of bottom-side insulation layers 310. In one example the substrate 302 is a PVDF film. In this embodiment compared to the exemplary embodiment of FIG. 2, additional conductive layers 304, 308 and insulation layers 306, 310 have been added to the top-side of the substrate 302 and the bottom-side of the substrate 302. Specifically, by adding additional conductive layers 304, 308 and insulation layers to either side of the substrate 302, the complexity of the sensor circuit is improved, providing enhanced protection of hardware. While four top-side conductive layers 304 and four bottom-side conductive layers 308 are illustrated in FIG. 3, additional layers may be added to either the top-side or bottom side of the substrate 302 to increase the complexity of the tamper sensor 300 as desired.

Figure 4:
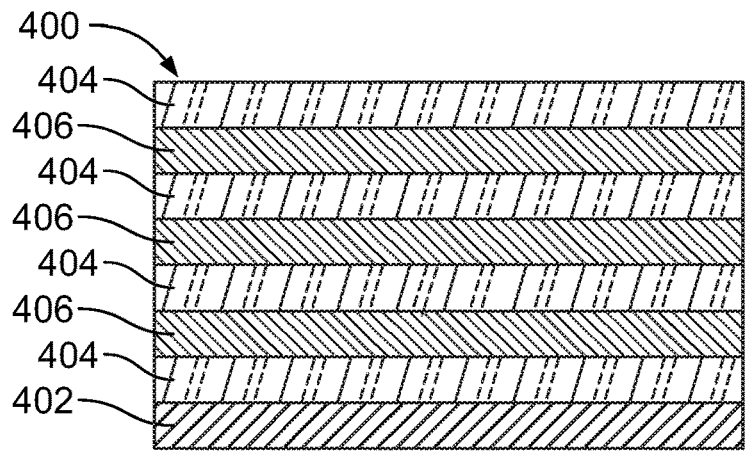
FIG. 4 is a schematic view of a tamper sensor in accordance with an exemplary embodiment.

FIG. 4 illustrates a schematic diagram of a tamper sensor 400 in accordance with an exemplary embodiment. In this embodiment a substrate 402 is provided with a plurality of conductive layers 404 and a plurality of insulation layers 406 stacked on the conductive layers 404 as described in previous exemplary embodiments. In one example the substrate 402 is a PVDF film. In this exemplary embodiment conductive layers 404 and insulation layers 406 are only on one side of substrate 402. In this manner, spatial characteristics for some applications are improved.

Figure 5:
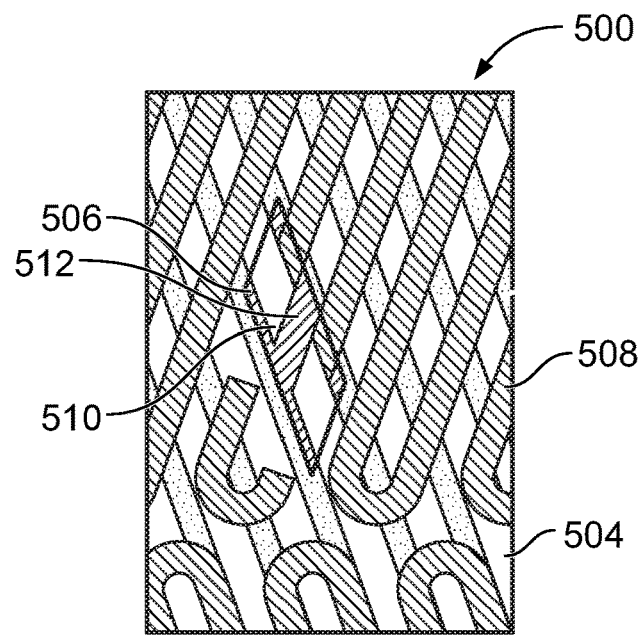
FIG. 5 is a schematic view of a tamper sensor in accordance with an exemplary embodiment.
Figure 6:
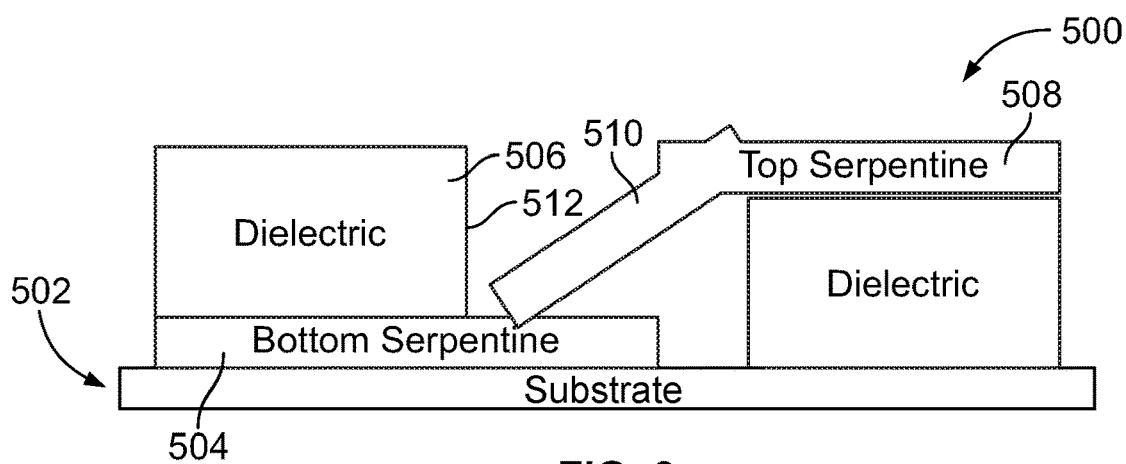
FIG. 6 is a sectional view of a tamper sensor in accordance with an exemplary embodiment.

FIG. 5 illustrates a top schematic view of a portion of an exemplary tamper sensor 500. FIG. 6 illustrates a sectional view of the tamper sensor 500 of FIG. 5. The tamper sensor 500 includes a substrate 502 (FIG. 5), a first conductive layer 504, an insulation layer 506, second conductive layer 508, and via 510 electrically connecting the first conductive layer 504 and second conductive layer 508.

The substrate 502 in one example is a PVDF film. Specifically, in this example embodiment the first conductive layer 504 is a printed serpentine trace and the insulation layer 506 is printed on the first conductive layer 504. The insulation layer 506 includes a window 512 therein such that when the second conductive layer 508 that is also a printed serpentine trace can be connected to the first conductive layer 504 with the via 510 that is disposed through the window 512 to contact both the first conductive layer 504 and second conductive layer 508. Such placement of the window 512 and thus via 510 in one embodiment are determined by an algorithm to ensure randomness of the placement to enhance security.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A tamper sensor comprising:
   a substrate formed from a flexible polyvinylidene fluoride or polyvinylidene difluoride film;
   a first conductive layer placed on a surface of the substrate;
   an insulation layer stacked on the first conductive layer;
   a second conductive layer placed on top of the insulation layer to form a layered tamper circuit;
   wherein the insulation layer on the first conductive layer includes one or more windows formed therein to provide one or more vias through the one or more windows to electrically connect the first conductive layer and second conductive layer, and wherein the one or more windows are positioned in a manner determined to enhance security of the tamper sensor; and
   wherein the substrate is the only substrate of the tamper sensor, and wherein the first conductive layer is in continuous contact with the surface of the substrate.

2. The tamper sensor of claim 1, wherein the layered tamper circuit is a mesh layered tamper circuit formed by printing the first conductive layer on the substrate, printing the insulation layer on the conductive layer, and printing the second conductive layer on the insulation layer.

3. The tamper sensor of claim 1, wherein the conductive layer includes one of a serpentine trace, a rectilinear trace, or a straight trace.

4. The tamper sensor assembly of claim 1, wherein the conductive layer is a flood plane, and the insulation layer is a flood plane.

5. The tamper sensor of claim 1, further comprising: a via electrically connecting the first conductive layer to the second conductive layer.

6. The tamper sensor of claim 5, wherein the first conductive layer is a serpentine trace, the second conductive layer is a serpentine trace, and the via is a blind via or a buried via.

7. The tamper sensor of claim 1, further comprising: a second insulation layer stacked on the second conductive layer; and a third conductive layer stacked on the second insulation layer.

8. The tamper sensor of claim 1, wherein the first conductive layer is placed on a first side of the substrate and further comprising: a third conductive layer placed on a second side of the substrate that is opposite the first side; a second insulation layer stacked on the third conductive layer; and a fourth conductive layer placed on the second insulation layer.

9. The tamper sensor of claim 1, wherein the first conductive layer has a thickness that is different than a thickness of the insulation layer.

10. A tamper sensor assembly comprising:
    a tamper sensor comprising:
       a first conductive layer placed on a first surface of a substrate, the first conductive layer having a continuous interface surface that extends along an entirety of the first conductive layer and that is in direct contact with the substrate, wherein the substrate is formed from a flexible polyvinylidene fluoride or polyvinylidene difluoride film;
       an insulation layer stacked on the first conductive layer; and
       a second conductive layer stacked on the insulation layer;
       a hardware circuitry electrically coupled to the substrate; and
       wherein the insulation layer includes one or more windows formed therein to provide one or more vias through the one or more windows to electrically connect the first conductive layer and second conductive layer, and wherein the one or more windows are positioned in a manner determined to enhance security of the tamper sensor;
       wherein the first conductive layer, second conductive layer, and insulation layer are configured to cause one of a closed circuit or open circuit at one or more of the first conductive layer and second conductive layer when the tamper sensor is altered; and
       wherein responsive to alteration of the tamper sensor, the tamper sensor modifies operation of the hardware circuitry.

11. The tamper sensor assembly of claim 10, wherein the first conductive layer, second conductive layer, and insulation layer are printed on the substrate to form a mesh circuit.

12. The tamper sensor assembly of claim 11, wherein the first conductive layer includes one of a serpentine trace, a rectilinear trace, or a straight trace, and the second conductive layer includes one of a serpentine trace, rectilinear trace, or straight trace.

13. The tamper sensor assembly of claim 12, wherein a via is disposed through a window in the insulation layer to electrically connect the first conductive layer to the second conductive layer.

14. The tamper sensor assembly of claim 12, wherein the first conductive layer is crimped to the second conductive layer to electrically connect the first conductive layer to the second conductive layer.

15. The tamper sensor assembly of claim 10, wherein the first conductive layer is placed on a first side of the substrate and wherein the tamper sensor further comprises a third conductive layer that is placed on a second side of the substrate that is opposite the first side.

16. The tamper sensor assembly of claim 10, wherein the substrate is the only substrate of the tamper sensor assembly.

17. A tamper sensor comprising:
a substrate formed from polyvinylidene fluoride or polyvinylidene difluoride (PVDF) film;
a first serpentine trace printed on and in continuous contact with the PVDF film;
an insulation layer printed on the PVDF film;
a second serpentine trace printed on the insulation layer; and
a via secured between the first serpentine trace and second serpentine trace, wherein the via is disposed through a window in the insulation layer, wherein the window is positioned in a manner determined to enhance the security of the tamper sensor;
wherein the first serpentine trace, second serpentine trace, insulation layer, and via collectively form a mesh circuit.

18. The tamper sensor of claim 17, wherein the substrate is the only substrate of the tamper sensor.

19. The tamper sensor of claim 17, wherein the mesh circuit includes an adhesive material.

* * * * *